United States Patent
Robertson et al.

(10) Patent No.: US 9,481,121 B2
(45) Date of Patent: Nov. 1, 2016

(54) EXTRUSION DIE PLATE ASSEMBLY FOR A PELLETIZER SYSTEM

(71) Applicant: Kennametal Inc., Latrobe, PA (US)

(72) Inventors: J. Denny Robertson, Rogers, AR (US); Gregory G. Herndon, Rogers, AR (US); Pavel Ledyan, Bentonville, AR (US)

(73) Assignee: KENNAMETAL INC., Latrobe, PA (US)

( * ) Notice: Subject to any disclaimer, the term of this patent is extended or adjusted under 35 U.S.C. 154(b) by 333 days.

(21) Appl. No.: 14/075,832

(22) Filed: Nov. 8, 2013

(65) Prior Publication Data

US 2015/0132424 A1    May 14, 2015

(51) Int. Cl.
| | |
|---|---|
| *B29C 47/30* | (2006.01) |
| *B29C 47/88* | (2006.01) |
| *B29B 9/06* | (2006.01) |
| *B29C 47/00* | (2006.01) |
| *B29C 47/08* | (2006.01) |

(52) U.S. Cl.
CPC ........... *B29C 47/8895* (2013.01); *B29B 9/065* (2013.01); *B29C 47/30* (2013.01); *B29C 47/0011* (2013.01); *B29C 47/0014* (2013.01); *B29C 47/0066* (2013.01); *B29C 47/0852* (2013.01); *Y10T 29/49947* (2015.01)

(58) Field of Classification Search
CPC .............. B29C 47/0066; B29C 47/08; B29C 47/0852; B29C 47/30; B29C 47/8895; B29B 9/065
See application file for complete search history.

(56) References Cited

U.S. PATENT DOCUMENTS

| | | | |
|---|---|---|---|
| 2,918,701 A | 12/1959 | Hull et al. | |
| 3,224,037 A | 12/1965 | Robbins et al. | |
| 3,271,822 A | 9/1966 | Rhino | |
| 3,867,082 A * | 2/1975 | Lambertus | B29B 9/065 425/313 |
| 4,264,553 A | 4/1981 | Loo | |
| 4,269,584 A | 5/1981 | Kroll et al. | |
| 5,679,380 A | 10/1997 | Munz et al. | |
| 6,474,969 B1 | 11/2002 | Ready et al. | |
| 2012/0207864 A1 | 8/2012 | Fridley | |

FOREIGN PATENT DOCUMENTS

| | | |
|---|---|---|
| DE | 19811089 A1 | 10/1998 |
| DE | 212009000038 U1 | 11/2010 |
| EP | 0151390 A2 | 8/1985 |
| WO | WO0103900 A1 | 1/2001 |

OTHER PUBLICATIONS

Sep. 10, 2015—First Office Action—K-04374-DE-NP; German Patent Application 10 2014 116 381.3

* cited by examiner

*Primary Examiner* — Yogendra Gupta
*Assistant Examiner* — Joseph Leyson
(74) *Attorney, Agent, or Firm* — Matthew S. Bedsole

(57) ABSTRACT

Provided is a die plate assembly for an underwater pelletizing system, wherein molten plastic flows through a die plate and exits into a fluid bath for further processing. The assembly provides a seal against water leakage and effective insulation to prevent heat loss from a heated die plate. The assembly includes a die plate having a plurality of through holes for receiving fasteners for mounting the plate to another portion of the pelletizer system, and at least one insulation chamber for insulating the die plate from the fluid bath located on a downstream side of the die plate. The assembly further includes at least one gasket covering one or more of the through holes to seal one or more through holes from the fluid bath.

19 Claims, 5 Drawing Sheets

EXTRUSION DIE PLATE ASSEMBLY FOR A PELLETIZER SYSTEM

BACKGROUND OF THE INVENTION

1. Field of the Invention

The present invention relates to an underwater pelletizing assembly, and more particularly to a die plate and gasket for use in an underwater pelletizer.

2. Description of Related Art

Pelletizers are used to process molten thermoplastics into pellets. The pellets may, in turn, be used in other processes for manufacturing various plastic materials or objects.

An underwater pelletizing assembly typically consists of a die plate mounted to an extruding apparatus. Smaller die plates, having a diameter of less than 20 inches, are generally dome or conical shaped. Such smaller die plates are termed dome-shaped die plate assemblies. Larger die plates (in excess of about 20 inches in diameter) are center-mounted, flat die plates having an inner ring of bolt holes, positioned near the center of the plate, and an outer ring of bolt holes, extending around the periphery of the die plate. The subject invention is related to flat die plates.

The extruding apparatus forces molten thermoplastic resin through orifices of the die plate, forming thin polymer strands. The strands are extruded from the die plate into a water bath. More specifically, the proximal side of the die plate may include a plurality of low pressure slots for receiving the molten resin. The molten resin passes from a chamber associated with the slot and into tapered channels extending from the chamber toward an orifice having a diameter of about 0.10 inches and located on the distal surface of the plate. The molten resin is extruded through these orifices, thereby forming the thin strands of polymer resin. The strands are cut by rotating knives positioned adjacent to the distal surface of the die plate. The cutting takes place underwater in the water bath. The cut pellets contact the cooler water and harden, thereby forming thermoplastic pellets of a generally uniform shape and size.

Typically, an underwater pelletizing assembly is configured so that a constant stream of water passes over the distal surface of the die. The water must be cool enough to permit solidification of the extruded polymer at an acceptable rate. Specifically, the pellets should solidify before being permitted to deform as a result of contact with adjacent pellets or the sides of the water container or conduit. The hardened pellets are transported from the die face by the constant water stream. The cut pellets are removed from the water stream by a filtration apparatus. Once removed from the water stream, the hardened pellets may be dried using a blower, heater, or similar drying apparatus.

To form pellets of a specific size and shape, the orifices of the extrusion die must remain free and clear of solidified polymer material. Occlusion of portions of the orifices by solidified polymer material causes formation of irregular shaped pellets. If the polymer resin does not harden until it is removed from the die face, then the possibility of occlusion of the channels is substantially reduced. However, in that case, the formed pellets may not solidify fast enough. The pellets may contact one another or deform against the sides of the water bath.

In many underwater pelletizing systems, a heating device is used to heat the die plate to ensure that thermoplastic resin passing therethrough does not solidify until after it is expelled from the orifices. For example, a die plate may include electrical heating coils extending through the plate structure for selectively providing heat to the plate surface. Alternatively, the die plate may be exposed to a heating fluid such as hot oil or steam to maintain a desired plate temperature.

Several problems result from exposing a heated die plate to a constant stream of cooling water. Most significantly, water flowing across the die plate may leak into bolt holes causing corrosion and damage to the bolt holes and bolts. Sealing structures, such as gaskets, are used to prevent such degradation of the bolts and bolt holes.

In addition, water passing over the face of a heated die plate effectively dissipates heat from the die plate, unnecessarily cooling the die plate and heating the circulating water. Therefore, an insulating material is often placed between the die plate and water stream to prevent unnecessary heat loss to the water stream. By reducing heat loss to the water stream, the energy required to heat the die plate to the sufficient temperature, to prevent hardening of polymer resin in the orifices of the die plate, is effectively reduced.

With reference to FIGS. 1-3, a die plate 10 for an underwater pelletizing assembly is depicted, as is known in the prior art. Such die plates 10 are commercially available from a number of sources, including Kennametal Inc. of Latrobe, Pa. The die plate 10 is a center-mounted flat die plate having an inner ring 12 of through holes 14 and an outer ring 16 of through holes 15. Fasteners 18, such as bolts, extending through the through holes 14, 15 mount the die plate 10 to other elements of the assembly, such as the extruding apparatus. The die plate 10 is configured to be heated by a fluid heating substance, such as steam or oil.

To prevent water from entering the through holes 14, 15, gaskets are placed over the through holes 14, 15 to form a seal therewith. Gaskets suitable for use with die plates are also manufactured by Kennametal Inc. Gaskets suitable for use with Kennametal die plates are also available from a number of third party manufacturers. As shown in FIG. 1, two separate gaskets are provided. An outer gasket 22 covers the outer ring 16 of through holes 15. An inner gasket 24 covers the inner ring 12 of through holes 14.

With continued reference to FIGS. 1-3, the outer gasket 22 is a ring-shaped gasket. The inner gasket 24 is a disc-shaped gasket covering the inner ring 12 of through holes 14, as well as the central portion of the die plate 10. Each gasket 22, 24 is covered by a metallic retainer plate, namely outer retainer plate 27 and inner retainer plate 26, that are similar in shape to the respective gaskets 22, 24. The gaskets 22, 24 and retainer plates 26, 27 are attached to the die plate 10 by retainer screws 52 inserted through corresponding retainer holes 54. The gaskets 22, 24 provide effective seals for the through holes 14, 15. In addition, the gaskets 22, 24 provide effective insulation between the water stream and the distal face of the die plate 10. Particularly, the gaskets 22, 24 ensure that the water stream is not in direct contact with the plate 10 or with the fasteners 18.

Gaskets 22, 24 are commonly constructed from elastomeric materials, such as Aflas (a copolymer of tetrafluoroethylene (TFE) and propylene (P)) and Garlock (a polytetrafluoroethylene (PTFE) containing inorganic microsphere additives). The gaskets 22, 24 may consist of a single layer of an elastomeric material or may include multiple layers laminated together. The multiple layers may be formed from different elastomeric materials to obtain different insulating or sealing characteristics. Gaskets 22, 24 maintain structural integrity when exposed to temperatures up to about 440° F. As long as the continuous water stream is provided to dissipate heat from the distal surface of the die plate 10, the gaskets 22, 24 are not exposed to temperatures in excess of the 440° F. upper boundary. However, if the water stream is stopped prior to the die plate 10 cooling down, then, since the gasket 22, 24 is no longer being cooled by the flow of water, but is still being heated, the gasket 22, 24 may overheat to temperatures in excess of 500° F. Exposure to such elevated temperatures causes the gasket 22, 24 to warp and form gaps between the gasket 22, 24 and die plate 10. Water leaks through the gaps and collects between the gasket 24 and surface of the die plate 10. When the heating mechanism supplying heat to the gasket is turned on again, the water is rapidly converted to steam. While the gaps are large enough to allow the liquid water to seep in, they are not large enough to permit rapidly expanding steam to exit. As a result, steam may become "trapped" under the disc-shaped inner gasket 24. The trapped steam may exert substantial pressure on the gaskets 22, 24, retainer plates 26, 27, and retainer screws 52 connecting the inner gasket 24 to the die plate 10. Such pressure may be sufficient to separate the inner gasket 24 and inner retainer plate 26 from the die plate 10 and irreparably damage the inner gasket 24 and inner retainer plate 26.

In view of the difficulties associated with die plates 10 and the inner gasket 24 of the prior art, there is a need for a die plate 10 and inner gasket 24 for an underwater pelletizer that effectively seals through holes 14 of the inner ring 12 of a center-mounted die plate 10. The inner gasket 24 and outer gasket 22 should also effectively insulate the heated die plate 10 from the continuous cool water stream, to prevent heat loss from the die plate 10 and to improve energy efficiency of the die plate 10. Additionally, the die plate 10 and inner gasket 24 should be configured to avoid trapping steam between the die plate 10 and inner gasket 24 to prevent gasket failure when water between the die plate and gasket is converted to steam. Finally, it would be beneficial for the die plate 10 to limit the types of gaskets that may be applied thereto. Specifically, gaskets which tend to excessively trap steam should not be able to be used with the die plate and underwater pelletizing assembly.

SUMMARY OF THE INVENTION

The die plate assembly of the present invention is configured to address some or all of the above described deficiencies of die plates and gaskets known in the prior art. Specifically, provided is a die plate and gasket that provides an effective seal against water leakage and effective insulation to prevent heat loss from a heated die plate. The gasket is also configured so that steam can easily escape from between the gasket and die plate, avoiding pressure buildup beneath the gasket.

Therefore, an extrusion die plate assembly for an underwater pelletizer system, wherein molten plastic flows through a die plate and exits into a fluid bath for further processing, is provided. The assembly includes at least one die plate having a plurality of through holes for receiving fasteners for mounting the plate to another portion of the pelletizer system, and at least one insulating chamber for insulating the die plate from the fluid bath located on a downstream side of the die plate. The assembly further includes at least one gasket covering one or more of the through holes to seal one or more through holes from the fluid. In certain embodiments, at least a portion of the at least one gasket is positioned between the fluid and at least a portion of the insulating chamber.

In certain configurations, the at least one gasket is an annular gasket. The die plate assembly further includes at least one retainer, the retainer being substantially identical in shape as the at least one gasket. Optionally, the die plate body is a center-mounted die plate. In that case, the through holes are arranged to form an inner ring of through holes and an outer ring of through holes. An inner annular gasket is configured to cover the inner ring of through holes and an outer annular gasket is configured to cover the outer ring of through holes.

In certain further configurations, the insulating chamber is covered by an insulation chamber cover, and the gasket contacts at least a portion of the cover. In such configurations, the cover comprises a peripheral groove, about the circumference of the cover, configured to receive at least a portion of the gasket.

In certain further configurations, the gasket is formed from an elastomeric material. The elastomeric material may be in the form of one or more polymer layers. The polymer layers may be formed from tetrafluoroethylene, propylene, and combinations thereof.

According to a further aspect of the invention, a method of forming a die plate assembly for an underwater pelletizer, wherein molten plastic flows through a die plate and exits into a fluid bath for further processing, is provided. The method includes providing a die plate having a plurality of through holes for receiving fasteners for mounting the plate to another portion of the pelletizer system, and at least one void space for forming an insulation chamber. The method further includes placing an insulation chamber cover over at least a portion of the void space, thereby forming at least one enclosed or partially enclosed insulation chamber. The method further includes attaching at least one gasket to a portion of the die plate, such that the gasket covers at least one of the plurality of through holes.

In certain embodiments of the method, the at least one gasket contacts at least a portion of the insulation chamber cover, thereby covering at least a portion of the insulation chamber. Additionally, in certain configurations, the die plate is a center-mounted die plate, and the through holes are arranged in a ring configuration. Furthermore, the through holes may be arranged to form an inner ring of through holes and an outer ring of through holes. Optionally, an annular gasket is provided to cover the inner ring of through holes and a separate annular gasket is provided to cover the outer ring of through holes.

According to a further aspect of the invention, an extrusion die plate assembly for an underwater pelletizer system, wherein molten plastic flows through a die plate and exits into a fluid bath for further processing, is provided. The assembly includes a center-mounted die plate having an inner ring of through holes and an outer ring of through holes, wherein the through holes are configured to receive fasteners for mounting the plate to another portion of the pelletizer system. The assembly also includes at least one annular gasket covering the inner ring of through holes to seal the through holes from the fluid bath.

In certain configurations, the die plate includes an annular groove configured to receive the annular gasket in a recessed orientation relative to a raised central portion of the die plate. When the gasket is in the recessed position, the gasket is flush with a surface of the raised central portion of the die plate.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

DESCRIPTION OF THE INVENTION

Figure 2:
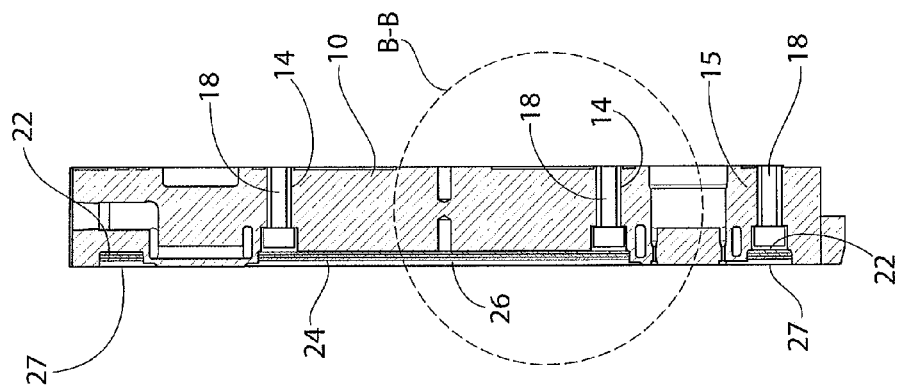
FIG. 2 is a cross-sectional view of the die plate assembly of FIG. 1, taken along section A-A, as is known in the prior art.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. With regard to the die plate, the term "proximal" refers to the side of the die plate adjacent to an extruding apparatus that receives the molten polymer. The term "distal" refers to the downstream side of the die plate, from which the molten polymer is extruded. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The presently invented die plate assembly is configured to address the difficulties of center-mounted die plate assemblies previously described. Particularly, the presently invented die plate assembly is configured to prevent steam from becoming trapped between the distal surface of the die plate and the gasket by providing multiple escape points for created steam. Allowing steam to easily escape from the die plate surface prevents trapped steam from increasing pressure and damaging the die plate or gasket. As a result of these improvements, steam entrapment and gasket degradation is minimized. Additionally, the die plate assembly provides effective insulation between the heated die plate and a water bath for cooling the heated die plate. Insulation prevents heat loss between the die plate and water bath, reducing the energy required to maintain the die plate at a recommended operating temperature. Finally, the die plate assembly improves overall reliability of the pelletizing system by ensuring that only gaskets capable of allowing steam to escape from the die plate can be used, thereby minimizing gasket failure.

Figure 4:
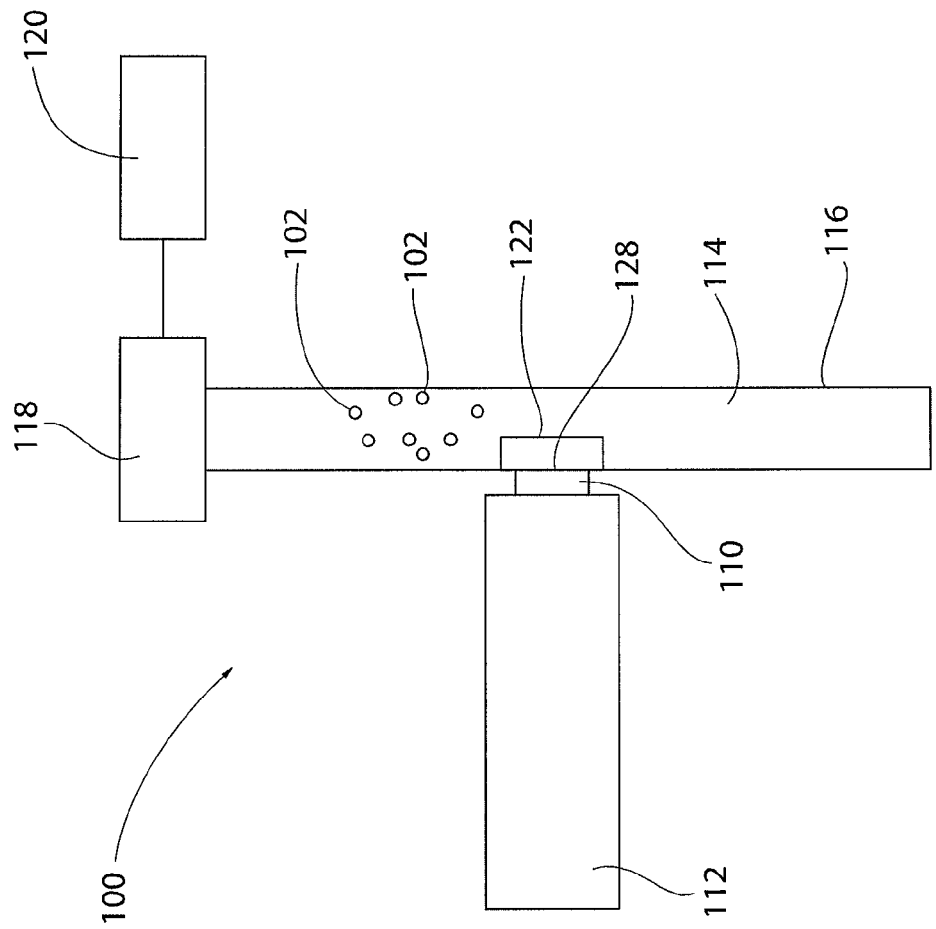
FIG. 4 is a schematic drawing of an underwater pelletizing system, as is known in the prior art.

In view of these desired improvements, an underwater pelletizing system for producing pellets formed from molten polymer is provided herein. With reference to FIG. 4, an underwater pelletizing system 100, as is known in the prior art, is illustrated. The system 100 provides thermoplastic resin, in the form of molten polymer, from an extruder apparatus 112 to a die plate 110. The distal surface 128 of the die plate 110 is in fluid contact with a water bath 114, such as a conduit 116, for directing water flow from the die plate 110 to a filtering apparatus 118 and drying apparatus 120. The molten polymer is extruded through the die plate 110 and into the water bath 114. The extruded polymer enters the water bath 114 as thin strands. Once extruded from the die plate 110, the strands are cut into the pellets 102 by a rotating cutter 122 positioned adjacent to the distal surface 128 of the die plate 110. The pellets 102 are expelled into the water bath 114, which causes the pellets 102 to solidify. The water bath 114 is generally provided as a continuous stream that transports the formed pellets 102 from the distal surface 128 of the die plate 110 to the filtration apparatus 118. The formed pellets 102 are filtered from the stream of water and dried with the drying apparatus 120. The formed pellets can be used to produce thermoplastic structures by further fabrication processes.

Figure 1:
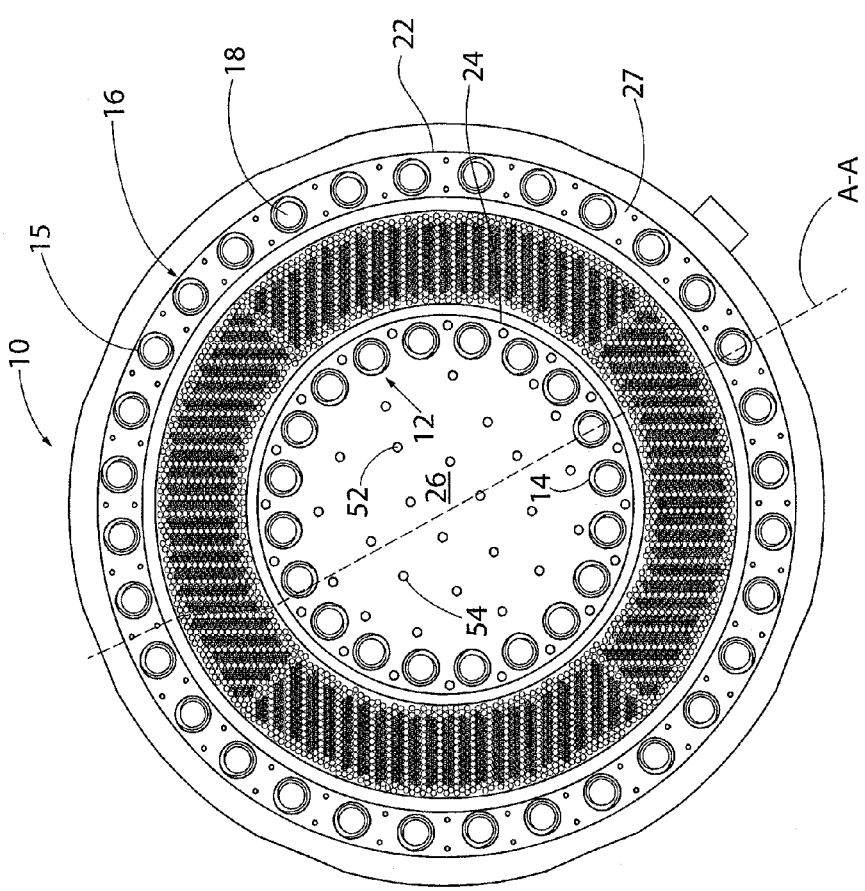
FIG. 1 is a top view of a distal surface of a die plate assembly, as is known in the prior art.
Figure 3:
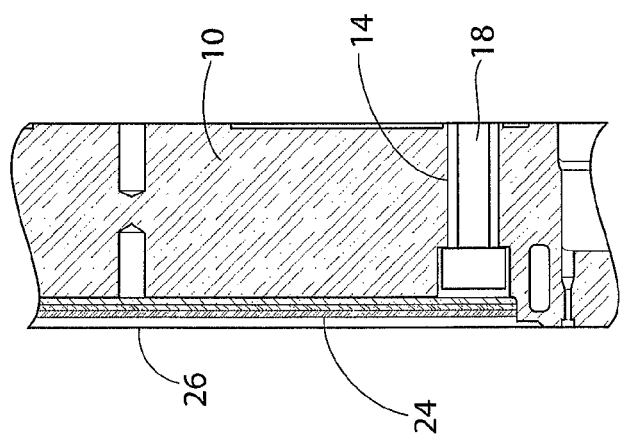
FIG. 3 is a close up sectional view of FIG. 2, taken along section B-B, as is known in the prior art.

With reference to FIGS. 5-8, a die plate 210 and gaskets 222, 224 of the present invention, which could be used with the system 100, will now be described in detail. As with die plates 10 known in the prior art and depicted in FIGS. 1-3, in a preferred and non-limiting embodiment, the presently invented die plate 210, as illustrated in FIGS. 5-8, is a center-mounted cylindrical plate having an inner ring 212 of through holes 214 and an outer ring 216 of through holes 215 for mounting the die plate 210 to the extruder apparatus 112 (shown in FIG. 4). Additional connectors, adapters, or fastening mechanisms (not shown) may also extend from the periphery of the die plate 210, providing additional locations for fastening the die plate 210 to other elements of the pelletizing system 100. The die plate 210 may be formed from metals or metal alloys including, but not limited to, steel, titanium carbide, and the like.

The plate 210 includes an annular extrusion region 232, located on the distal side 228 of the plate 210, formed with a plurality of small orifices 234. The surface of the extrusion region 232 is covered with a hard material, such as carbide or another similar hard and non-conductive metal or alloy. Thermoplastic resin to be formed into pellets is provided, in the form of molten polymer, to the extrusion orifices 234 through extrusion channels 235 (shown in FIG. 6) accessible from the proximal surface 230 of the plate 210.

The die plate 210 is a heated plate to prevent hardened thermoplastic material from occluding the extrusion orifices 234. Accordingly, in one non-limiting embodiment, the plate 210 includes a plurality of ports 236 (shown in FIG. 8) for receiving heating media, such as steam or heated oil. The heating media enters the ports 236 and is circulated through the plate 210 through annular channels positioned generally adjacent to the extrusion region 232 of the plate 210.

A portion of the distal surface 228 of the die plate 210 is covered by two separate gaskets. An inner gasket 224 covers an inner ring 212 of through holes 214 and bolts 218 inserted therein. An outer gasket 222 covers an outer ring 216 of through holes 215 and bolts 218 inserted therein. The gaskets 222, 224 are formed from elastomeric materials such as Aflas (a copolymer of tetrafluoroethylene (TFE) and propylene (P)) and Garlock (a polytetrafluoroethylene (PTFE) containing inorganic micro sphere additives). The gaskets 222, 224 may be multi-layered structures including one or more Aflas layers interspersed between one or more Garlock layers. The gaskets 222, 224 are formed from a material capable of insulating the die plate 210 from the water bath 114 (shown in system 100 illustrated in FIG. 4).

Unlike die plate assemblies in the prior art, in the present invention, both the inner gasket 224 and the outer gasket 222 are annular in structure. Specifically, as shown in FIGS. 5-8, an annular inner gasket 224 does not cover the central portion 225 of the die plate 210. Thus, the inner gasket 224 does not provide as much insulation for the central portion 225 of the die plate 210, as was provided by the disc-shaped inner gaskets used in the prior art.

The gaskets 222, 224 are secured to the die plate 210 by corresponding retainer plates 226, 227 formed from a non-corrodible material, such as stainless steel. The retainer plates 226, 227 are connected to the die plate 210 by fasteners, such as retainer screws 252, clips, or tabs, configured to extend through holes 254 in the retainer plates 226.

To compensate for this missing insulation between the water bath 114 (shown in FIG. 4) and the die plate 210, the die plate 210 includes at least one insulation chamber 238 for insulating the central portion 225 of the heated die plate 210 in the region previously covered by the disc-shaped gaskets. The insulation chamber 238 may be a void or empty space filled with air at atmospheric temperature. Alternatively, the insulation chamber 238 may be wholly or partially filled with any sort of insulating fluid, foam, or solid material. In a preferred and non-limiting embodiment, the insulation chamber 238 is formed from a substantially circular void space 240 or chamber positioned about the longitudinal axis 211 of the die plate 210 inside the inner ring 212 of through holes 214. An insulation chamber support 242 extends upward from the center of the void space 240. The void space 240 is covered by an insulation chamber cover 244, thereby forming the enclosed or partially enclosed insulation chamber 238. The cover 244 may be welded in place, thereby forming a weld seal 246 around the periphery of the cover 244. A similar weld seal 248 may be formed to connect the cover 244 to the support 242 located in the center of the void space 240. Alternatively, the insulation chamber 238 may be integrally formed into the die plate 210, meaning that a separate welding step is not required.

Figure 7:
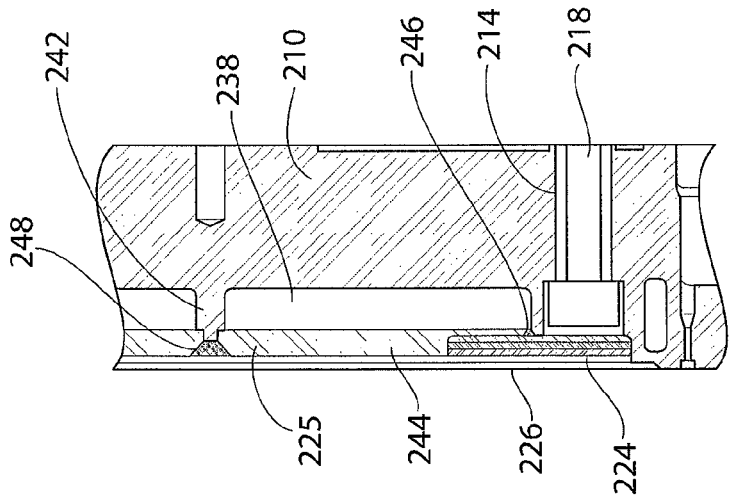
FIG. 7 is a close up sectional view of FIG. 6, taken along section B-B.
Figures 5, 6:
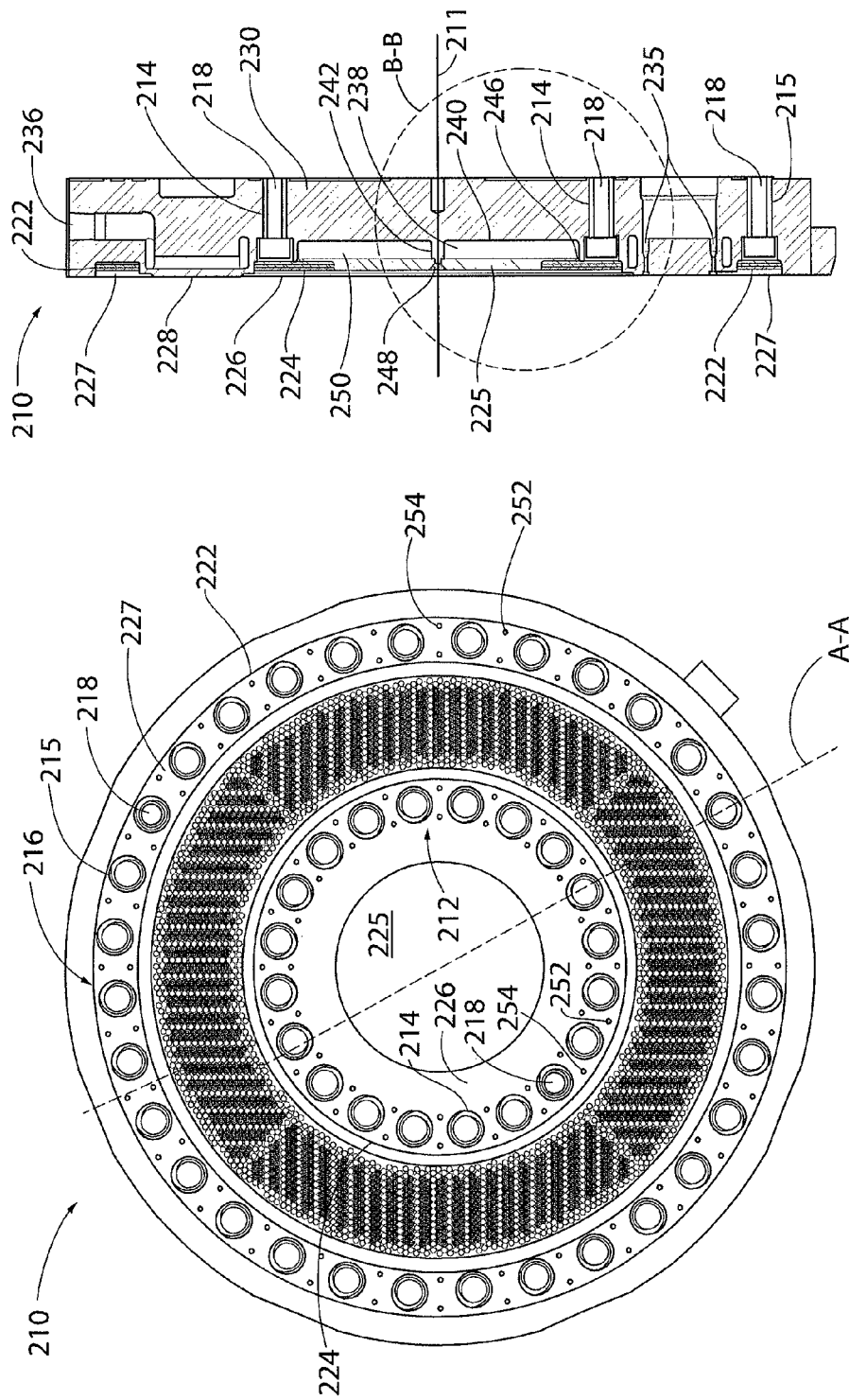
FIG. 5 is a top view of a distal surface of a die plate assembly, according to the principles of the present invention.
FIG. 6 is a cross-sectional view of the die plate assembly of FIG. 5, taken along section A-A.
Figure 8:
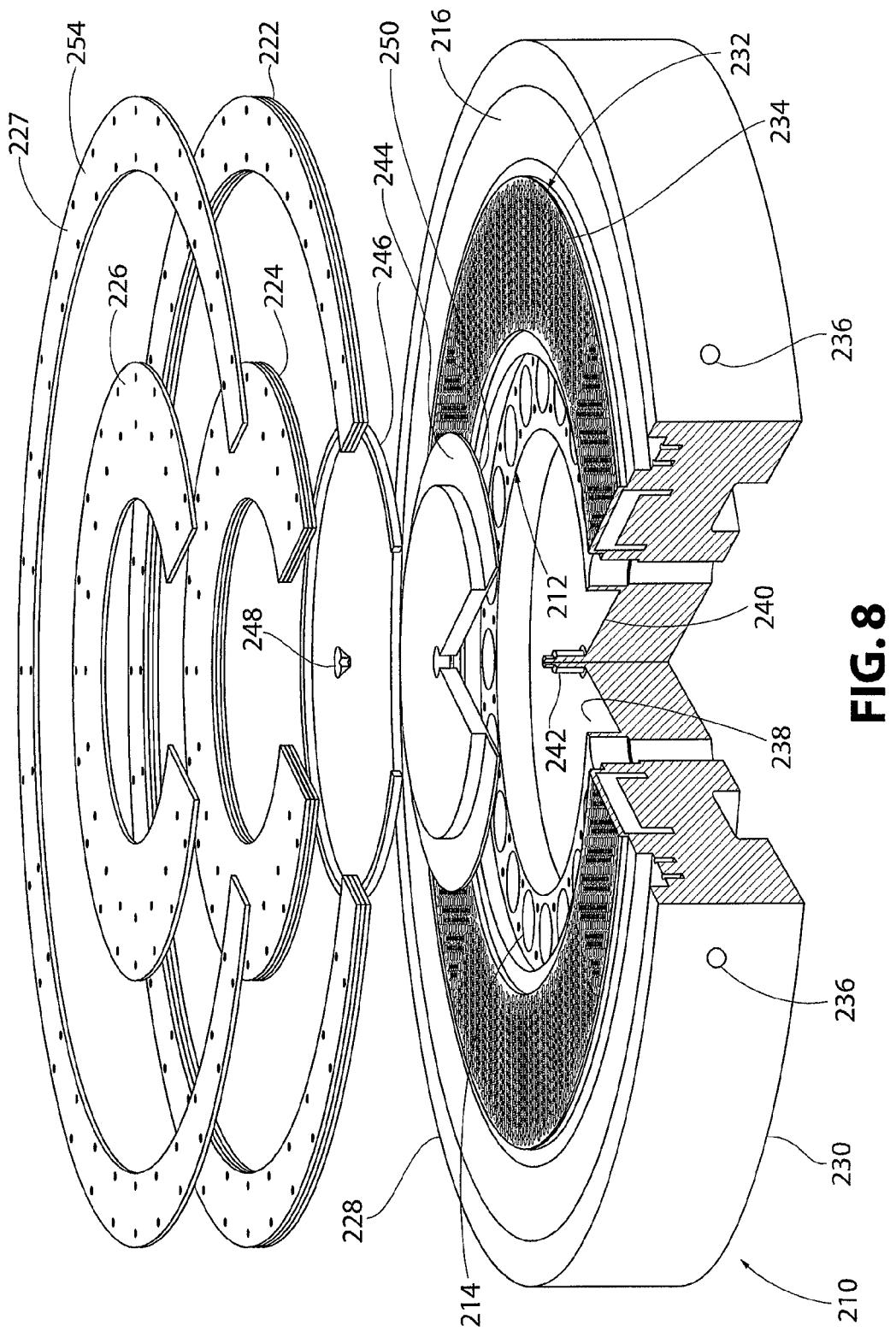
FIG. 8 is a perspective expanded view of the die plate assembly of FIG. 4, having an eighth portion removed therefrom.

With continued reference to FIGS. 5-8, in a preferred and non-limiting embodiment, at least a portion of the inner gasket 224 contacts the cover 244 and covers a portion of the insulation chamber 238. It has been found that covering a portion of the insulation chamber 238 with the inner gasket 224 improves the insulation of the die plate 210. As shown in FIGS. 6 and 7, approximately the inner half of the gasket 224 is in contact with the cover 244 and covers a portion of the insulation chamber 238. However, the portion of the inner gasket 224 covering the insulation chamber 238 is not intended to be limiting and may include far more than 50% of the surface area of the inner gasket 224. Alternatively, the inner gasket 224 is not required to cover any portion of the insulation chamber 238.

In certain embodiments, the insulation chamber cover 244 includes a groove 250 around its periphery for receiving at least a portion of the inner gasket 224. Thus, the inner gasket 224 is configured to form a flush planar surface with the central portion 225 of the die plate 210. Similarly, the outer gasket 222 may be received within a recess formed by the outer ring 216 of through holes 215. Thus, in a preferred and non-limiting embodiment, the entire distal surface 228 of the constructed die plate 210 and gaskets 222, 224, is essentially planar.

As discussed above, the gaskets 222, 224 and retainer plate 226 are held in place by fasteners, such as retainer screws 252 inserted through corresponding holes 254 in the gaskets 222, 224 and retainer plate 226. As shown in FIG. 5, the retainer screws 252 are uniformly positioned throughout the surface of the outer gasket 222 between the through holes 215. However, the retainer screws 252 are only provided along the outer half of the inner gasket 224. Specifically, one or more holes 254 are positioned between each though hole 214. There are no holes 254 on the inner half of the inner gasket 224 and corresponding retainer plate 226. Accordingly, the retainer screws 252 do not pass through the insulation chamber 238, which is positioned below the inner half of the inner gasket 224.

In use, molten polymer is provided to the die plate 210 from an extruder apparatus 112. The molten thermoplastic material enters the die plate 210 through slots on the back surface of the plate 210. The molten polymer is advanced through the slots and into tapered channels extending towards the extrusion orifices 234 of the extrusion region on the distal surface 228 of the plate 210. Extruded polymer enters the water bath 114 at the distal surface 228 of the plate 210 and is divided into pellets 102 by the rotating cutter 122. In the event that a seal of the gasket 222, 224 is compromised, such as when the gasket is warped, water from the water bath 114 may come into contact with the distal surface 228 of the die plate 210, below the gaskets 222, 224. Since the die plate 210 is heated, the water immediately transitions to steam. In die plates 10 of the prior art, the steam becomes trapped under the center disc-shaped inner gasket 224.

The annular inner gasket 224 of the present invention provides numerous escape points for the created steam. Particularly, the steam may be expelled from either the inner edge or outer edge of the annular inner gasket 224. Steam does not become trapped in the central portion 225 of the die plate 210. In fact, it is believed that the absence of retainer screws 252 and screw holes 254 on the inner portion of the inner gasket 224 provides additional avenues for steam to escape compared with annular gaskets in which retainer screws 252 are positioned on the entire gasket 224 surface. As such, the possibility that created steam will produce sufficient pressure to damage the inner gasket 224 or die plate 210 is effectively reduced.

With continued reference to FIGS. 5-8, a further advantage of the presently invented die plate 210 is that the shape and configuration of the gaskets 222, 224 is effectively controlled. Specifically, the inner gasket 224 must be sized to fit within the peripheral groove 250 formed by the insulation chamber cover 244 and inner ring 212 of through holes 214. The inner gasket 224 also should be an appropriate thickness to form a flush planar surface with the central portion 225 of the die plate 210. Therefore, both the shape and thickness of the inner gasket 224 is effectively restricted. The size and depth of the recess of the outer ring 216 of through holes 215 similarly restricts the dimensions of the outer gasket 222 that can be used with the die plate 210. By effectively restricting the size of the gaskets 222, 224, the possibility that an operator will install a gasket 222, 224 which is an incorrect size or shape and, therefore, more likely to trap steam between the gasket 222, 224 and die plate 210, is effectively reduced. Accordingly, restricting the size and shape of the gasket 222, 224 provides an additional safety feature against incorrect operation of the die plate 210 and gaskets 222, 224, which could lead to die plate 210 failure or damage to the pelletizing system 100.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

What is claimed is:

1. An extrusion die plate assembly for an underwater pelletizer system, wherein, during operation, molten plastic flows through an extruder and exits into a fluid bath for further processing, wherein the assembly comprises:
    a die plate at the exit of the extruder, wherein the die plate has a plurality of through holes for receiving fasteners for mounting the plate to the extruder, and at least one insulation chamber within the die plate for insulating the die plate from the fluid bath located on a downstream side of the plate; and
    at least one gasket covering one or more of the through holes to seal one or more through holes from the fluid bath, wherein the insulation chamber is covered by an insulation chamber cover comprising a peripheral groove about the circumference of the cover and configured to receive at least a portion of the gasket contacting the cover.

2. The extrusion die plate assembly of claim 1, wherein at least a portion of the at least one gasket is positioned between the fluid bath and at least a portion of the insulation chamber.

3. The extrusion die plate assembly of claim 1, wherein the at least one gasket is an annular gasket.

4. The extrusion die plate assembly of claim 1, further comprising at least one retainer connected to the at least one gasket, the retainer being substantially identical in shape as the gasket.

5. The extrusion die plate assembly of claim 1, wherein the die plate is a center-mounted die plate, and wherein the through holes are arranged to form, an inner ring of the through holes and an outer ring of the through holes.

6. The extrusion die plate assembly of claim 5, wherein an annular gasket covers the inner ring of the through holes.

7. The extrusion die plate assembly of claim 6, wherein the insulation chamber is positioned at the center of the die plate, radially inward from the inner ring of through holes.

8. The extrusion die plate assembly of claim 1, wherein the gasket comprises an elastomeric material.

9. The extrusion die plate assembly of claim 8, wherein the gasket comprises polymer layers formed from tetrafluoroethylene, propylene, and combinations thereof.

10. An extrusion die plate assembly for an underwater pelletizer system, wherein molten plastic flows through an extruder and exits into a fluid bath for further processing, wherein the assembly comprises:
    a center-mounted die plate at the exit of the extruder, wherein the die plate has an inner ring of through holes and an outer ring of through holes, wherein the through holes are configured to receive fasteners for mounting the plate to the extruder;
    at least one annular gasket covering the inner ring of through holes to seal the through holes from the fluid bath; and
    an annular groove of the die plate configured to receive the annular gasket in a recessed orientation relative to a raised central portion of the die plate.

11. The extrusion die plate assembly of claim 10, wherein, when in the recessed position, the annular gasket is flush with a surface of the raised central portion of the die plate.

12. The extrusion die plate assembly of claim 10, wherein the at least one annular gasket comprises an elastomeric material.

13. An extrusion die plate assembly for an underwater pelletizer system, wherein, during operation, molten plastic flows through an extruder and exits into a fluid bath for further processing, wherein the assembly comprises:
    a die plate at the exit of the extruder, wherein the die plate has a plurality of through holes for receiving fasteners for mounting the plate to the extruder, and at least one insulation chamber within the die plate for insulating the die plate from the fluid bath located on a downstream side of the plate; and
    an inner gasket covering one or more of the through holes to seal one or more through holes from the fluid bath, wherein the insulation chamber is covered by an insulation chamber cover, and the inner gasket at least partially covers an exterior surface of the insulation chamber cover.

14. The extrusion die plate of claim 13, wherein at least 50% of the inner gasket covers the exterior surface of the insulation chamber cover.

15. The extrusion die plate assembly of claim 13, wherein the insulation chamber is integrally formed into the die plate.

16. The extrusion die plate assembly of claim 13, wherein the insulation chamber is formed from a substantially circular void space.

17. The extrusion die plate assembly of claim 16, wherein the insulation chamber cover is welded into place.

18. The extrusion die plate assembly of claim 13, wherein the inner gasket is an annular gasket.

19. The extrusion die plate assembly of claim 13, wherein the insulation chamber comprises a central support.

* * * * *